United States Patent

Bloch et al.

(10) Patent No.: US 9,306,769 B2
(45) Date of Patent: Apr. 5, 2016

(54) CELL-BASED LINK-LEVEL RETRY SCHEME

(75) Inventors: Gil Bloch, Zichron Yaakov, IL (US);
Michael Kagan, Zichron Yaakov (IL);
Diego Crupnicoff, Buenos Aires (AR);
Tamir Azarzar, Kadima (IL); Ran Ravid, Tel Aviv (IL)

(73) Assignee: MELLANOX TECHNOLOGIES TLV LTD., Ra'anana (IL)

(*) Notice: Subject to any disclaimer, the term of this patent is extended or adjusted under 35 U.S.C. 154(b) by 352 days.

(21) Appl. No.: 12/897,808

(22) Filed: Oct. 5, 2010

(65) Prior Publication Data

US 2012/0082164 A1  Apr. 5, 2012

(51) Int. Cl.
*H04L 12/28* (2006.01)
*H04L 12/56* (2006.01)
*H04L 12/54* (2013.01)
*H04L 12/801* (2013.01)
*H04L 12/70* (2013.01)

(52) U.S. Cl.
CPC ............ *H04L 12/5601* (2013.01); *H04L 47/34* (2013.01); *H04L 2012/5652* (2013.01)

(58) Field of Classification Search
CPC . H04L 47/34; H04L 1/0041; H04L 2012/565; H04L 2012/5652; H04L 12/5601; H04L 12/1881; H04L 1/1621; H04L 11/1628; H04L 1/1642; H04L 69/324
USPC .......... 370/394, 395.1, 395.52, 470–473, 476
See application file for complete search history.

(56) References Cited

U.S. PATENT DOCUMENTS

| | | | | |
|---|---|---|---|---|
| 5,136,584 A | * | 8/1992 | Hedlund | 370/399 |
| 6,016,401 A | * | 1/2000 | Rostoker et al. | 712/29 |
| 6,128,283 A | * | 10/2000 | Sabaa et al. | 370/236 |
| 6,445,705 B1 | * | 9/2002 | Holden et al. | 370/394 |
| 6,452,926 B1 | * | 9/2002 | Wiklund | 370/388 |
| 6,671,832 B1 | * | 12/2003 | Apisdorf | 714/52 |
| 6,724,779 B1 | * | 4/2004 | Alleyne et al. | 370/517 |
| 6,731,602 B1 | * | 5/2004 | Watanabe et al. | 370/231 |
| 6,754,205 B1 | * | 6/2004 | Sakaue | 370/360 |
| 6,894,969 B1 | * | 5/2005 | Chidambaran | H04L 12/5601 370/216 |
| 7,016,304 B2 | | 3/2006 | Chou et al. | |
| 7,320,043 B2 | * | 1/2008 | Shatas et al. | 710/105 |
| 2003/0058867 A1 | * | 3/2003 | Oono et al. | 370/395.1 |
| 2004/0062198 A1 | * | 4/2004 | Pedersen et al. | 370/229 |
| 2007/0130353 A1 | | 6/2007 | Chou et al. | |
| 2007/0260965 A1 | * | 11/2007 | Schmidt et al. | 714/799 |
| 2009/0089638 A1 | * | 4/2009 | Heise et al. | 714/748 |
| 2009/0213861 A1 | * | 8/2009 | Benner et al. | 370/400 |
| 2010/0220595 A1 | * | 9/2010 | Petersen | 370/235 |
| 2010/0309916 A1 | * | 12/2010 | Oskouy et al. | 370/392 |
| 2010/0316065 A1 | * | 12/2010 | Kapil et al. | 370/465 |

* cited by examiner

*Primary Examiner* — Hoang-Chuong Vu
(74) *Attorney, Agent, or Firm* — D. Kliger IP Services Ltd.

(57) ABSTRACT

A method for communication includes receiving a packet at a first node for transmission over a link to a second node. The data in the packet is divided into a sequence of cells of a predetermined data size. The cells have respective sequence numbers. The cells are transmitted in sequence over the link, while storing the transmitted cells in a buffer at the first node. The first node receives acknowledgments indicating the respective sequence numbers of the transmitted cells that were received at the second node. Upon receiving an indication at the first node that a transmitted cell having a given sequence number was not properly received at the second node, the stored cells are retransmitted from the buffer starting from the cell with the given sequence number.

16 Claims, 2 Drawing Sheets

CELL-BASED LINK-LEVEL RETRY SCHEME

FIELD OF THE INVENTION

The present invention relates generally to communication networks, and specifically to methods and devices for enhancing communication reliability.

BACKGROUND OF THE INVENTION

In packet communication networks, data packets are typically transmitted from a source node, via a path made up of multiple links, to a destination node. End-to-end transmission (from source node to destination node) is commonly handled by transport-layer protocols, such as the well-known Transport Control Protocol (TCP). In reliable transport protocols, the destination node tracks and acknowledges serial numbers of arriving packets and may request retransmission when a packet is lost or corrupted.

Transmission of the packet over each of the links (also referred to as hops) along the path is handled by a link-layer protocol, which controls the interaction between the nodes at either end of the link. Common link-layer protocols, such as the Ethernet and InfiniBand data link protocols, use error detection mechanisms, such as cyclical redundancy codes (CRC), to detect and drop packets containing errors. In general, however, link-layer protocols do not provide mechanisms for packet acknowledgment and retransmission on demand.

Some link-layer retransmission schemes are known in the art. For example, U.S. Pat. No. 7,016,304, whose disclosure is incorporated herein by reference, describes a link-layer system that includes a link-layer control module and a retry queue for storing transmitted data packets. The retry control module is coupled to the link layer-control module, which directs the retry queue to discard the transmitted data packets when the link-layer control module receives an acknowledgment bit.

As another example, U.S. Patent Application Publication 2009/0213861, whose disclosure is incorporated herein by reference, describes a mechanism for reliable link-layer (RLL) packet retry. RLL packets comprises a RLL header preceding a data packet. The RLL header comprises an RLL start-of-frame (SOF) character and an RLL packet sequence number (PSN). If the transmitting port does not receive an RLL acknowledgment packet from the link, acknowledging receipt of the data packet, the port re-transmits the data packet from its buffer.

SUMMARY

Embodiments of the present invention that are described hereinbelow provide a cell-based link-layer retransmission scheme, which enhances transmission reliability while making efficient use of memory and bandwidth resources.

There is therefore provided, in accordance with an embodiment of the present invention, a method for communication, which includes receiving a packet including data at a first node for transmission over a link to a second node. The data are divided into a sequence of cells of a predetermined data size, the cells having respective sequence numbers. The cells are transmitted in the sequence over the link, while storing the transmitted cells in a buffer at the first node. Acknowledgments are received at the first node indicating the respective sequence numbers of the transmitted cells that were received at the second node. Upon receiving an indication at the first node that a transmitted cell having a given sequence number was not properly received at the second node, the stored cells are retransmitted from the buffer starting from the cell with the given sequence number.

In some embodiments, the predetermined data size is no more than 128 bytes and may be no more than 64 bytes.

In a disclosed embodiment, receiving the indication includes receiving a negative acknowledgment from the second node referring to the given sequence number. Alternatively or additionally, receiving the indication includes detecting that a time limit has expired for receiving an acknowledgment.

In some embodiments, the method includes, upon receiving an acknowledgment specifying an acknowledged sequence number, deleting from the buffer the transmitted cells whose respective sequence numbers are less than or equal to the acknowledged sequence number.

Typically, transmitting the cells includes grouping the cells for transmission in one or more frames, wherein each frame includes a header indicating a sequence number of at least one of the cells in the frame, and the transmitted cells do not contain the respective sequence numbers.

Additionally or alternatively, transmitting the cells includes computing respective error detection codes for the cells and transmitting the error detection codes with the cells.

In a disclosed embodiment, the cells transmitted from the first node to the second node are outgoing cells, and the method includes receiving at the first node incoming cells, having respective incoming sequence numbers, from the second node, wherein transmitting the cells includes adding to at least one of the outgoing cells at the first node an acknowledgment of the incoming cells, the acknowledgment including at least one of the incoming sequence numbers.

There is also provided, in accordance with an embodiment of the present invention, communication apparatus, including a memory, which is disposed at a first node in a communication network and is configured to receive and buffer a packet including data for transmission over a link to a second node. A controller is coupled to the memory and is configured to divide the data into a sequence of cells of a predetermined data size, the cells having respective sequence numbers, to transmit the cells in the sequence over the link, while storing the transmitted cells in the memory, to receive acknowledgments at the first node indicating the respective sequence numbers of the transmitted cells that were received at the second node, and upon receiving an indication at the first node that a transmitted cell having a given sequence number was not properly received at the second node, to retransmit the stored cells from the memory starting from the cell with the given sequence number.

There is additionally provided, in accordance with an embodiment of the present invention, a switch, including a switching core and a plurality of ports, coupled to the core, for receiving and transmitting data packets. Circuitry is associated respectively with each port among at least some of the ports of the switch. The circuitry includes a memory, which is configured to receive from the port and buffer a packet including data for transmission via the switching core to another port, and a controller, which is coupled to the memory and is configured to divide the data into a sequence of cells of a predetermined data size, the cells having respective sequence numbers. The controller is configured to transmit the cells in the sequence via the switching core, while storing the transmitted cells in the memory, to receive acknowledgments from the other port indicating the respective sequence numbers of the transmitted cells that were received at the other port, and upon receiving an indication that a transmitted cell having a given sequence number was not properly received at the other port, to retransmit the stored cells from the memory starting from the cell with the given sequence number.

The present invention will be more fully understood from the following detailed description of the embodiments thereof, taken together with the drawings in which:

DETAILED DESCRIPTION OF EMBODIMENTS

Embodiments of the present invention that are described hereinbelow provide methods and apparatus for reliable link-level packet communications. The term "link" is used in the context of the present patent application and in the claims in its conventional sense, to mean a physical connection (wired or wireless) between two communication nodes. When the node at one end of the link receives a packet for transmission over the link, the node divides the data in the packet into a sequence of cells of a predetermined uniform size, which is typically much smaller than the packet size. For example, each cell may contain 128 bytes of data, or less, or even 64 bytes or less. The use of such small cells as the basis for reliable communications reduces the size of the buffer memories required at the nodes and also reduces the additional bandwidth consumed when data retransmission is called for.

The transmitting node transmits the cells in sequence over the link, while storing the transmitted cells in a buffer. The transmitting node adds an error detection code, such as a CRC, to each transmitted cell and gives each cell a respective sequence number. To conserve bandwidth, however, the sequence number may be implicit and need not be explicitly inserted in every cell. For example, multiple cells may be grouped as a frame, with a frame header containing the sequence number of only the first cell in the frame. The receiving node checks the cells against the corresponding error detection codes and periodically sends an acknowledgment to the transmitting node indicating the sequence number of the most recent cell that was properly received. Upon receiving these acknowledgments, the transmitting node deletes from its buffer all the transmitted cells whose respective sequence numbers are less than or equal to the acknowledged sequence number.

On the other hand, the transmitting node may receive, from time to time, an indication that a transmitted cell having a given sequence number was not properly received at the other end of the link. This indication may be a negative acknowledgment sent from the other node, reporting that the cell with the given sequence number was corrupted or lost. Alternatively or additionally, the indication may be generated by a timer at the transmitting node, which detects that a predefined time limit for receiving an acknowledgment has expired. Upon receiving such indications, the transmitting node retransmits the stored cells from the buffer, starting from the cell with the indicated sequence number. This cell-based retransmission mechanism is in contrast to most link-level retry protocols, in which the entire packet (often comprising hundreds or thousands of bytes) must be retransmitted when a link-level error occurs.

Figure 1:
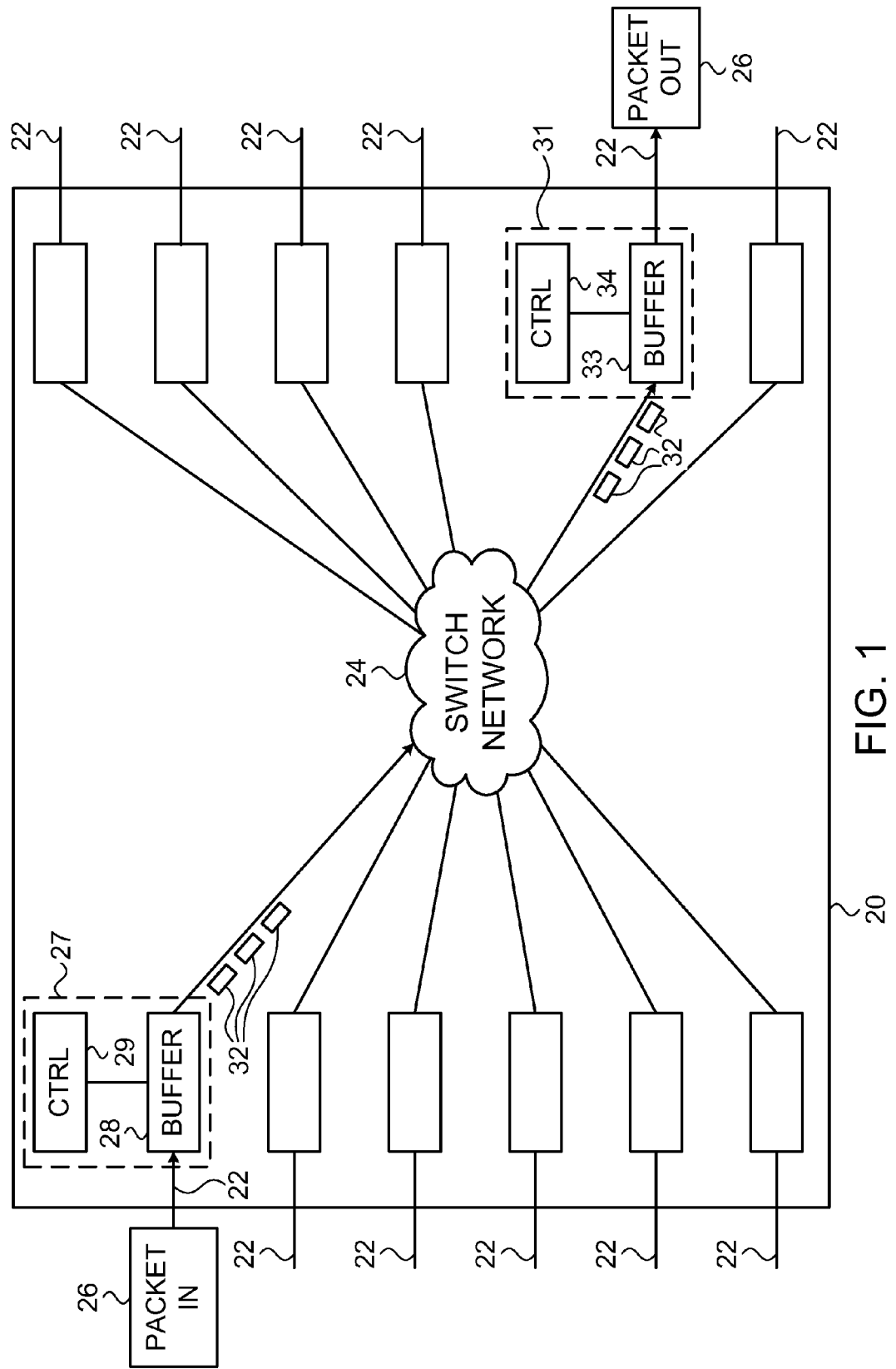
FIG. 1 is a block diagram that schematically illustrates a packet switch, in accordance with an embodiment of the present invention.

FIG. 1 is a block diagram that schematically illustrates apparatus for data transmission, in the form of a packet switch 20, in accordance with an embodiment of the present invention. Switch 20 is described here as an example of a link-layer network, in which packets are transmitted over links between pairs of nodes, as described in detail hereinbelow. The principles of the present invention, however, are in no way limited to switches and networks of this sort and may similarly be implemented on substantially any sort of link over which packets are forwarded between nodes.

Switch 20 comprises multiple ports 22, which are linked by a switching core, such as an internal switch network 24. Switch 20 receives packets 26, such as Ethernet, InfiniBand, or Fibre Channel packets (sometimes referred to alternatively as "frames"), via an input port, and forwards each packet via switch network 24 to the appropriate output port or ports. Switch network 24 is made up of one or more suitable interconnect devices, as are known in the art. Switch 20 may be implemented as a single integrated circuit chip or using multiple chips with interconnecting printed circuit traces and/or cables.

Typically, each port 22 is associated with a corresponding end-node of network 24. For the sake of simplicity, only a single input node 27 and a single output node 31 are shown explicitly in the figure, with a link between them passing through network 24. The features of nodes 27 and 31 may be present at all of ports 22 or only at some of the ports.

Each of nodes 27 and 31 comprises a corresponding buffer memory 28, 33, with a controller 29, 34 coupled to the memory. Typically, small buffers, on the order of 2 KB, are sufficient when the present cell-based retransmission scheme is used (in contrast to buffers of about 20 KB that are required for packet-based retransmission—resulting in a very substantial reduction in the overall memory required in the switch). Controllers 29, 34 carry out logical functions associated with packet forwarding, including segmentation of input packets 26 into cells 32 for transmission through network 24, reassembly of the cells into packets for output from switch 20, and retransmission of cells through network 24 as necessary. These functions are described in detail hereinbelow. For these purposes, controllers 29 and 34 typically comprise suitable digital logic circuits, which may be implemented using dedicated or programmable hardware components. Alternatively or additionally, the controllers may comprise software-driven programmable processors. All such implementations are considered to be within the scope of the present invention.

Figure 2:
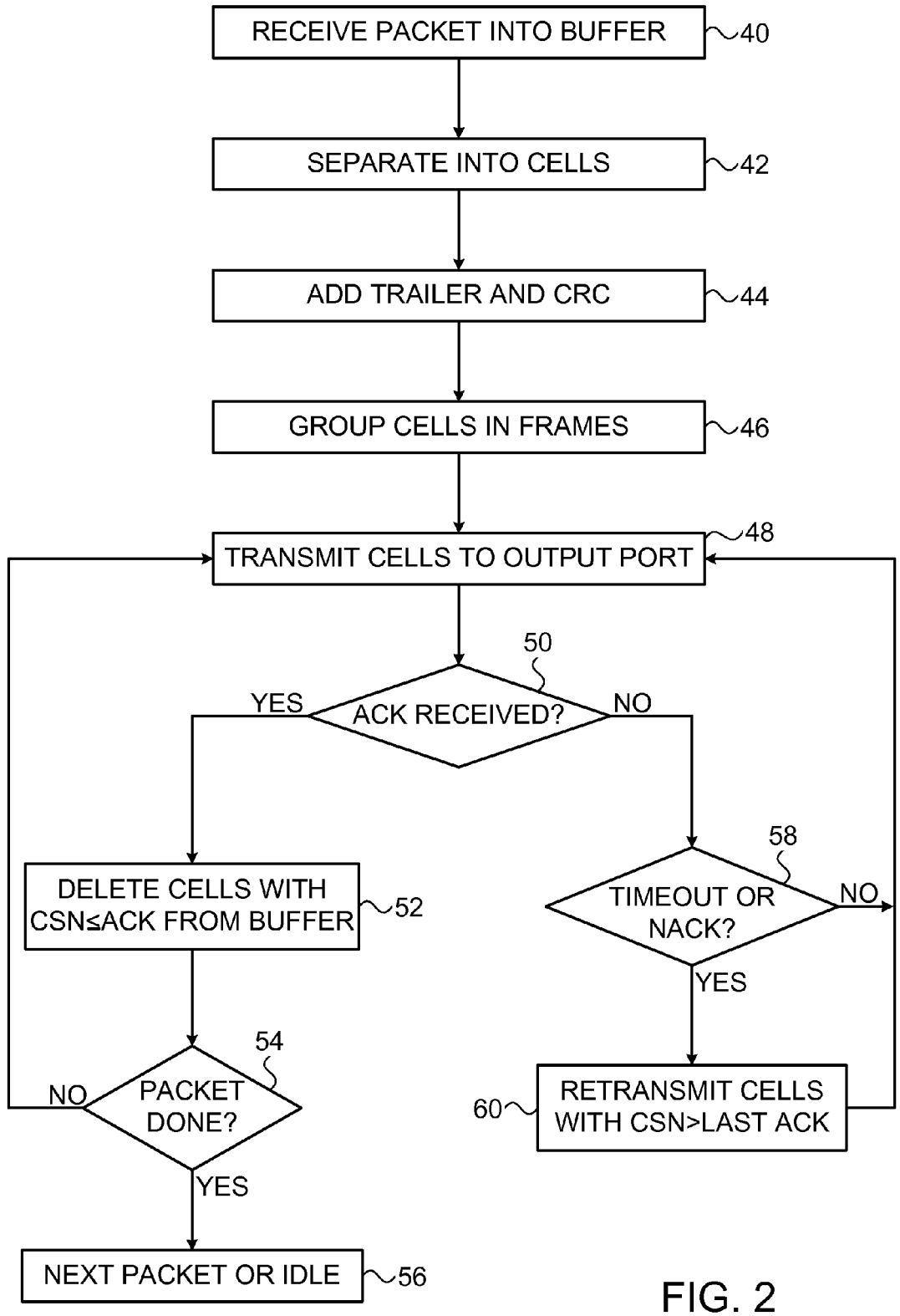
FIG. 2 is a flow chart that schematically illustrates a method for reliable link-level transmission, in accordance with an embodiment of the present invention.

FIG. 2 is a flow chart that schematically illustrates a method for reliable link-level transmission, in accordance with an embodiment of the present invention. The method is described hereinbelow, for the sake of clarity, with reference to the elements of switch 20, but this method may similarly be implemented over substantially any suitable type of data link.

The method is initiated when input port 22 receives packet 26 for forwarding, at a packet input step 40. The incoming packet data are held temporarily in buffer 28, although typically transmission of the data through switch network 24 commences well before the entire incoming packet has been received through port 22. Suitable logic in switch 20 (which may be embodied in controller 29) processes the packet header in order to identify the output port or ports to which the packet is to be forwarded, but this functionality, which is well known in the art, is beyond the scope of the present patent application.

Controller 29 separates the packet data into cells of a uniform, predetermined size, at a packet fragmentation step 42. The cell size may be configurable, by programming an appropriate register in switch 20, for example. For efficient use of memory and communication resources in switch 20, the cell size is typically much smaller than the packet size. For example, the cell data size may be no greater than 128 bytes, or even 64 bytes. If controller 29 has less than the required amount of data to fill a complete cell, it pads the cell with dummy data up to the required cell size. The sort of padding may be required, for example, in the last cell of a given packet.

The controller keeps count of the cells and assigns each cell an implicit cell sequence number (CSN). To conserve transmission bandwidth, however, most of the cells are typically not explicitly numbered. Rather, node 27 transmits the cell sequence numbers intermittently, and node 31 is able to track the sequence numbers of received cells simply by counting received bytes, since all the cells are of the same size.

Controller 29 computes and appends ancillary information to each cell, including an error detection code and a trailer, at a cell supplementation step 44. The error detection code may, for example, comprise a 16-bit CRC or any other suitable type of code that is known in the art. The trailer typically includes flag bits that can be set to indicate that the current cell is the last one in a given packet and to indicate that the cell has been padded with dummy data. (In the latter case, the last padding byte may contain a count of the number of padding bits or bytes that have been added so that the receiving node can remove the padding when reassembling the packet for output.) The trailer can also be used to acknowledge cells that have been transmitted over the link in the opposite direction. This acknowledgment function is described in detail hereinbelow. Although the ancillary information in the present example is appended at the end of each cell, some or all of this information may alternatively be placed in a cell header.

Controller 29 packages cells 32 for transmission into frames, at a cell grouping step 46. Typically, each frame contains a number of cells (for example, ten cells or more), each including the corresponding ancillary information that was computed at step 44. Alternatively, a frame may contain only a single cell, as may occur, for example, in transmission of a small control packet or of the last cell in a given packet. The frames generated at step 46 should not be confused with certain types of packets 26 (such as Ethernet packets) that are also sometimes referred to as "frames." Typically, each of these input "frames" will be broken up into multiple frames at step 46 for transmission through switch 20.

Each frame generated at step 46 includes a frame header, which contains the CSN of the first cell in the frame. The frame header may contain additional fields, such as a code indicating the frame type (for example, whether the frame contains normal packet data requiring reliable transmission, or whether the frame contains only signaling, such as an acknowledgment or other control information). Controller 29 typically adds a footer to the end of the frame.

Node 27 transmits cells 32 to node 31 at the intended output port 22, at a cell transmission step 48. Although the steps in FIG. 2 are shown, for the sake of simplicity of illustration, as occurring sequentially, in practice the functions of these steps go on concurrently in pipeline fashion. Thus, controller 29 generates new cells and frames at the same time as earlier cells and frames are transmitted through network 24 and new data are received from port 22. Upon beginning transmission at step 48, controller 29 sets a timer, which tracks the amount of time elapsed since an acknowledgment was received from node 31. This timer indicates whether the time limit for receiving an acknowledgment has expired.

Controller 34 tracks the CSNs of cells 32 that are received into buffer 33 by setting a CSN counter to the value in the latest frame header and incrementing the counter based on the number of cells received. Typically, to ensure that the data have not been corrupted in transit, controller 34 computes a CRC over the data in each cell and verifies that the result is equal to the CRC that was appended to the cell at node 27. When controller 34 ascertains that it has properly received one or more cells, it periodically transmits an acknowledgment (ACK) to node 27. Alternatively, upon determining that a given cell or cells have been corrupted or lost (because of a CRC error or a gap in CSNs between successive frames, for example) controller 34 may transmit a negative acknowledgment (NACK). The NACK typically indicates the CSN of the last cell that was properly received and requests retransmission starting from the next cell.

Typically, traffic passes over the link between nodes 27 and 31 in both directions, and controller 34 uses a field in the trailer of cells that it transmits to node 27 to acknowledge the received cells. For example, the trailer may contain a 12-bit CSN field, into which controller 34 inserts the CSN of the cell that it has most recently received properly from node 27. The trailer may also include a NACK flag that controller 34 sets to indicate whether all cells were received properly or whether an error occurred. For example, the flag may be set to 0 to indicate an ACK response and 1 for NACK. When the flag is set to 1, it indicates that an error occurred in the cell with the next CSN after the value contained in the CSN field. The use of the trailer field for acknowledgments is helpful in conserving link bandwidth.

Alternatively, when node 31 has no cells to transmit back to node 27 over a certain period of time (which should be less than the timeout period of the timer that is set in node 27 at step 48), controller 34 may transmit a dedicated ACK or NACK cell to node 27 in a special signaling frame. Optionally, when controller 34 finds that a certain cell has not been properly received at node 31, the controller may send a NACK frame immediately, rather than waiting for the allotted time period, so that node 27 will start retransmission without delay.

In either type of ACK (in the trailer of a data cell or a special ACK cell), acknowledgment of a given CSN implicitly indicates that all cells with lower CSN were properly received, even if not explicitly acknowledged.

Controller 29 monitors incoming traffic from node 31 for ACK responses, at an ACK reception step 50. Upon receiving an ACK with a given CSN, controller 29 resets its acknowledgment timer (or stops the timer if there are no more cells outstanding) and deletes from buffer 28 all cells with CSN less than or equal to the acknowledged CSN, at a cell deletion step 52. This step frees memory space for additional incoming data. Controller 29 checks whether it has completed transmission of the entire input packet 26, at a completion checking step 54. If so, the controller proceeds to the next input packet or idles if there is no packet awaiting transmission, at a completion step 56. Otherwise, the controller returns to step 48 to continue cell transmission.

If a positive acknowledgment is not received at step 50, controller 29 checks for a NACK or timeout of the acknowledgment timer, at a transmission failure step 58. If a NACK or timeout occurs, controller 29 interrupts the ongoing transmission and begins retransmitting cells from buffer 28, at a retransmission step 60. For this purpose, controller 29 may check the latest CSN value that was acknowledged by node 31, and begins retransmission starting from the next cell. (As noted earlier, a NACK cell typically indicates the CSN of the last cell that was properly received.) Controller 29 resumes normal transmission at step 48 beginning from this next CSN.

Although the method of FIG. 2 provides certain specific protocols and mechanisms for cell-based link-level signaling and retransmission, variations on these protocols and techniques may similarly be used for these purposes and are considered to be within the scope of the present invention. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
receiving a packet comprising data at a first node for transmission over a link to a second node;
dividing the data into a sequence of cells of a predetermined data size, the cells being identified by respective sequence numbers;
computing respective error detection codes for the payload data of each of the cells;
grouping the cells into link layer frames, such that each link layer frame includes multiple cells with their respective error detection codes for their payload data;
transmitting the link layer frames over the link, while storing the transmitted cells included in the transmitted link layer frames in a buffer at the first node;
receiving acknowledgments at the first node indicating the respective sequence numbers of the transmitted cells that were received at the second node; and
upon receiving an indication at the first node that a transmitted cell having a given sequence number was not properly received at the second node, retransmitting the stored cells from the buffer starting from the cell with the given sequence number.

2. The method according to claim 1, wherein the predetermined data size is no more than 128 bytes.

3. The method according to claim 2, wherein the predetermined data size is no more than 64 bytes.

4. The method according to claim 1, wherein receiving the indication comprises receiving a negative acknowledgment from the second node referring to the given sequence number.

5. The method according to claim 1, wherein receiving the indication comprises detecting that a time limit has expired for receiving an acknowledgment.

6. The method according to claim 1, and comprising, upon receiving an acknowledgment specifying an acknowledged sequence number, deleting from the buffer the transmitted cells whose respective sequence numbers are less than or equal to the acknowledged sequence number.

7. The method according to claim 1, wherein the cells transmitted from the first node to the second node are outgoing cells, and wherein the method comprises receiving at the first node incoming cells, having respective incoming sequence numbers, from the second node, and wherein transmitting the cells comprises adding to at least one of the outgoing cells at the first node an acknowledgment of the incoming cells, the acknowledgment comprising at least one of the incoming sequence numbers.

8. The method according to claim 1, wherein each frame comprises a header indicating a sequence number of at least one but not all of the cells in the frame, and wherein the transmitted cells do not contain the respective sequence numbers.

9. Communication apparatus, comprising:
a memory, which is disposed at a first node in a communication network and is configured to receive and buffer a packet comprising data for transmission over a link to a second node; and
a controller, which is coupled to the memory and is configured to divide the data into a sequence of cells of a predetermined data size, the cells being identified by respective sequence numbers, to compute respective error detection codes for the payload data of each of the cells, to group the cells into link layer frames, such that each link layer frame includes multiple cells with their respective error detection codes, and to transmit link layer frames over the link, while storing the transmitted cells included in the transmitted link layer frames in the memory, and
wherein the controller is configured to receive acknowledgments at the first node indicating the respective sequence numbers of the transmitted cells that were received at the second node, and upon receiving an indication at the first node that a transmitted cell having a given sequence number was not properly received at the second node, to retransmit the stored cells from the memory starting from the cell with the given sequence number.

10. The apparatus according to claim 9, wherein the predetermined data size is no more than 128 bytes.

11. The apparatus according to claim 10, wherein the predetermined data size is no more than 64 bytes.

12. The apparatus according to claim 9, wherein the indication that the transmitted cell was not properly received comprises a negative acknowledgment received from the second node referring to the given sequence number.

13. The apparatus according to claim 9, wherein the indication that the transmitted cell was not properly received comprises an expiration of a time limit for receiving an acknowledgment.

14. The apparatus according to claim 9, wherein the controller is configured, upon receiving an acknowledgment specifying an acknowledged sequence number, to delete from the memory the transmitted cells whose respective sequence numbers are less than or equal to the acknowledged sequence number.

15. The apparatus according to claim 9, wherein the cells transmitted from the first node to the second node are outgoing cells, and wherein incoming cells, having respective incoming sequence numbers, are received at the first node from the second node, and wherein the controller is configured to add to at least one of the outgoing cells at the first node an acknowledgment of the incoming cells, the acknowledgment comprising at least one of the incoming sequence numbers.

16. A switch, comprising:
a switching core;
a plurality of ports, coupled to the core, for receiving and transmitting data packets; and
circuitry associated respectively with each port among at least some of the ports of the switch, the circuitry comprising:
a memory, which is configured to receive from a port of the plurality of ports and buffer a packet comprising data for transmission via the switching core to another port of the plurality of ports; and
a controller, which is coupled to the memory and is configured to divide the data into a sequence of cells of a predetermined data size, the cells being identified by respective sequence numbers, to compute respective error detection codes for the payload data of each of the cells, to group the cells into link layer frames, such that each link layer frame includes multiple cells with their respective error detection codes, and to transmit the link layer frames via the switching core, while storing the transmitted cells included in the transmitted link layer frames in the memory, and
wherein the controller is configured to receive acknowledgments from the other port indicating the respective sequence numbers of the transmitted cells that were received at the other port, and upon receiving an indication that a transmitted cell having a given sequence number was not properly received at the other port, to retransmit the stored cells from the memory starting from the cell with the given sequence number.

* * * * *